(12) United States Patent
Garrard et al.

(10) Patent No.: US 9,780,625 B2
(45) Date of Patent: Oct. 3, 2017

(54) COOLING STATOR COILS OF AN ELECTRIC MOTOR

(71) Applicant: BorgWarner Inc., Auburn Hills, MI (US)

(72) Inventors: Tyler Garrard, Buellton, CA (US); Christopher Meszaros, Brighton, MI (US); Will Robert Nielsen Hippen, Santa Cruz, CA (US)

(73) Assignee: BorgWarner Inc., Auburn Hills, MI (US)

( * ) Notice: Subject to any disclaimer, the term of this patent is extended or adjusted under 35 U.S.C. 154(b) by 292 days.

(21) Appl. No.: 14/597,291

(22) Filed: Jan. 15, 2015

(65) Prior Publication Data

US 2015/0207386 A1    Jul. 23, 2015

Related U.S. Application Data

(60) Provisional application No. 61/928,599, filed on Jan. 17, 2014.

(51) Int. Cl.
*H02K 9/19*        (2006.01)
*H02K 15/02*       (2006.01)

(52) U.S. Cl.
CPC .............. *H02K 9/19* (2013.01); *H02K 15/02* (2013.01); *Y10T 29/49009* (2015.01)

(58) Field of Classification Search
CPC .......... H02K 9/19; H02K 9/197; H02K 9/193; H02K 15/02
USPC ....... 310/54, 58, 59, 194, 214, 215
See application file for complete search history.

(56) References Cited

U.S. PATENT DOCUMENTS

| | | | |
|---|---|---|---|
| 6,515,384 B1 * | 2/2003 | Kikuchi ................ | H02K 9/197 310/54 |
| 7,946,118 B2 * | 5/2011 | Hippen ................. | F01M 11/02 184/6.16 |
| 2003/0057797 A1 * | 3/2003 | Kaneko ................. | H02K 1/146 310/216.064 |
| 2003/0098630 A1 * | 5/2003 | Owada .................... | H02K 3/24 310/194 |
| 2007/0176499 A1 * | 8/2007 | Holmes .................. | H02K 9/19 310/54 |
| 2009/0015084 A1 * | 1/2009 | Kalavsky ............... | H02K 5/128 310/89 |

FOREIGN PATENT DOCUMENTS

GB         2500040 A  *  9/2013  ............ H02K 9/197

* cited by examiner

*Primary Examiner* — Terrance Kenerly
(74) *Attorney, Agent, or Firm* — Barnes & Thornburg LLP (57) ABSTRACT

Performance of an electric motor can be improved if coolant is provided to the coils of the stator. An electric motor is disclosed that has a shaft onto which the rotor is secured. The motor has a stator that is mounted on bearings that are mounted on the shaft. The stator has a plurality of coils. A coolant guide is provided that fills voids between the groups of windings. The coolant guide has a plurality of fingers with the fingers arranged between adjacent pairs of coils. The coolant guide has internal passages to accept pressurized coolant and outlet holes to spray coolant onto the coils. In other embodiments, the fingers guide coolant to reach all coils under the force of gravity.

17 Claims, 9 Drawing Sheets

COOLING STATOR COILS OF AN ELECTRIC MOTOR

FIELD

The present disclosure relates generally to an apparatus for providing coolant onto stator coils of an electric machine and to a method for manufacturing such apparatus.

BACKGROUND

The performance of an electric machine or electric motor can be increased if the components of the motor are prevented from overheating. It is known to provide a liquid to coils of the stator to remove energy. Some motors are flooded with a liquid coolant. However, with high-speed motors, the coolant increases the friction of the motor. It is desirable to provide the liquid coolant predominantly to the coils and to prevent coolant from contacting the rotor. Even if only the coils of the stator were flooded and the coolant kept off the rotor, to effectively cool the coils, it is more effective if flow to the coils is properly directed so that each coil receives sufficient coolant so that there are no hot spots.

SUMMARY

To promote more even cooling of the coils, a number of embodiments in which the coolant is distributed to the coils while avoiding coolant from contacting the rotor are disclosed.

To solve at least one problem in the prior art, an electric motor is disclosed. The electric motor has a housing, a shaft, and two bearings mounted between the shaft and the housing. A rotor is secured to the shaft between the bearings. The motor further includes a stator that is mounted in the housing and slid over the rotor. The stator has a plurality of coils. A coolant guide is provided that has a plurality of fingers arranged between adjacent pairs of the coils.

In some embodiments, the coolant guide has: a coolant inlet to receive pressurized coolant and coolant passages within the coolant guide which are in fluidic communication with the coolant inlet. Coolant passages extend into the fingers. Each finger of the coolant guide has a plurality of outlet holes arranged along at least a portion of the length of the fingers and the outlet holes are fluidly coupled to the coolant passages.

In other embodiments, the coolant guide has a first annular end cap, a second annular end cap, and a tubular shield having a first end and a second end with the first end coupled to the first annular end cap and the second end coupled to the second annular end cap. The coolant guide also has a coolant inlet at a position located higher than a first of the plurality of coils, a first coil.

In some embodiments, a surface of the tubular shield adjacent to the rotor has a plurality of axial grooves.

The stator further includes a back iron surrounding the plurality of coils and the back iron substantially abuts the first and second annular end caps. A drain opening is defined in one of the annular end caps.

In other embodiments, the coolant inlet is defined in the first annular end cap. At least a portion of the coolant supplied to the coolant inlet contacts a first of the plurality of coils, the first coil. Fingers adjacent to the first coil are a first and a second of the plurality of fingers, the first and second fingers. The first and second fingers are coupled to the first annular end cap. There is a first gap between the first finger and the second annular end cap. There is a second gap between the first finger and the second annular end cap. A first portion of coolant that is supplied to the first coil moves along the first finger toward the first gap and contacts a second of the plurality of coils, the second coil. A second portion of coolant that is supplied to the first coil moves along the second finger toward the second gap onto a third of the plurality of coils, the third coil.

In embodiments with more coils, the fingers adjacent the second coil are the first finger and a third of the plurality of fingers, the third finger. The fingers adjacent the third coil are the second finger and a fourth of the plurality of fingers, the fourth finger. The third and fourth fingers are coupled to the second annular end cap. There is a third gap between the third finger and the first annular end cap. There is a fourth gap between the fourth finger and the first annular end cap. At least a portion of the coolant that leaves the second coil contacts the third finger. A portion of coolant that is supplied to the second coil moves along the third finger toward the third gap and contacts a fourth of the plurality of coils, the fourth coil. A portion of coolant that is supplied to the third coil moves along the fourth finger toward the fourth gap and contacts a fifth of the plurality of coils, the fifth coil.

In yet other embodiments, a first end of the fingers is coupled to the first annular end cap and a second end of the fingers is coupled to the second annular end cap and the fingers have a plurality of holes defined along a portion of the length of the fingers. At least a portion of coolant supplied to the coolant inlet contacts a first of the plurality of coils. Fingers adjacent to the first coil are a first and a second of the plurality of fingers, the first and second fingers. A first portion of coolant that passes through holes in the first finger to drip onto a second of the plurality of coils, the second coil. A second portion of coolant passes through holes in the second finger to drip onto a third of the plurality of coils, the third coil.

In other embodiments, a first portion of the plurality of fingers extend outwardly from the first annular end cap and a second portion of the plurality of fingers extend outwardly from the second annular end. A first of the first portion of the plurality of fingers and a first of the second portion of the plurality of fingers extend between a first and a second of the plurality of coils with a gap between ends of the first of the first portion of the plurality of fingers and the first of the second portion of the plurality of fingers.

Also disclosed is an electronically controlled turbocharger that has a shaft having a turbine wheel affixed onto a first end of the shaft and a compressor wheel affixed onto a second end of the shaft; a rotor secured to the shaft and located between the turbine wheel and the compressor wheel; bearings mounted on the shaft, a first bearing located on the shaft between the turbine and the rotor; and a second bearing located on the shaft between the compressor wheel and the turbine wheel; a housing mounted onto the bearings; a stator supported in the housing; and a coolant guide having a plurality of fingers. The stator has a central opening. The stator is disposed over the rotor. The stator has a plurality of coils. The fingers of the coolant guide are arranged between adjacent coils.

The stator also includes a back iron. The coolant guide further includes a first annular end cap abutting a first end of the back iron and a second annular end cap abutting a second end of the back iron.

In some embodiments, the coolant guide has a coolant inlet to receive pressurized coolant and the coolant inlet is fluidly coupled to the coolant passages. The coolant passages extend into the fingers with an inlet to the coolant passage within the finger located at a first end of each finger.

The fingers of the coolant guide have a plurality of outlet holes arranged along a portion of the length of the fingers. The outlet holes are fluidly coupled to the coolant passages.

In embodiments without a tubular shield, the stator further includes: a substantially-cylindrical back iron, a plurality of teeth extending from an inner surface of the back iron, and a bobbin slid over each tooth onto which the coils are wrapped. The bobbin has an inner plate, an outer plate, and a middle section extending between the bottom and top plates. Each of the inner plate, the outer plate, and the middle section define an opening along an axis of the bobbin to permit installation of the bobbins onto the teeth. Coils are wound around the middle sections of the bobbins. The outer plates abut the inner surface of the back iron. A material is placed between adjacent inner plates to substantially prevent flow of coolant through adjacent inner plates.

In some embodiments, a coolant inlet is defined in the first annular end cap. At least a portion of the coolant supplied to the coolant inlet drops onto a first of the plurality of coils, the first coil. Fingers adjacent to the first coil are a first and a second of the plurality of fingers, the first and second fingers. The first and second fingers are coupled to the first annular end cap. There is a first gap between the first finger and the second annular end cap and a second gap between the second finger and the second annular end cap. A first portion of coolant that is supplied to the first coil moves along the first finger toward the first gap and contacts a second of the plurality of coils, the second coil. A second portion of coolant that is supplied to the first coil moves along the second finger toward the second gap and contacts a third of the plurality of coils, the third coil.

The fingers adjacent the second coil are the first finger and a third of the plurality of fingers, the third finger. The fingers adjacent the third coil are the second finger and a fourth of the plurality of fingers, the fourth finger. The third and fourth fingers are coupled to the second annular end cap. There is a third gap between the third finger and the first annular end cap and a fourth gap between the fourth finger and the first annular end cap.

In some embodiments, a first end of the fingers is coupled to the first annular end cap and a second end of the fingers is coupled to the second annular end cap and the fingers have a plurality of holes defined along a portion of the length of the fingers. At least a portion of coolant supplied to the coolant inlet drops onto a first of the plurality of coils. Fingers adjacent to the first coil are a first and a second of the plurality of fingers, the first and second fingers. A first portion of coolant that passes through holes in the first finger drips onto a second of the plurality of coils, the second coil. A second portion of coolant that passes through holes in the second finger drips onto a third of the plurality of coils, the third coil.

In some embodiments, the coolant guide also has a tubular shield with a first end of the tubular shield coupled to the first annular end cap and a second end of the tubular shield coupled to the second annular end cap.

Also disclosed is a method to assemble an electric motor in which fingers of a coolant guide are slid between adjacent coils of a stator of the electric motor. The coolant guide includes an annular cap to which a least a portion of the fingers are coupled.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

In the present disclosure, an electric motor is described. However, the electric motor may be alternatively called an electric machine. An electric machine can be operated as an electric motor in which electric energy is supplied to cause the electric machine to rotate or can be operated as a generator in which electric energy is extracted from the rotating electric machine.

The present disclosure can be applied to any electric machine. It is particularly helpful for high-speed motors. One such application is an electronically-controlled turbocharger (ECT) in which rotational speeds can be as high as 350,000 rpm in some applications. An ECT 40 is shown in cross section of an ECT 40 in FIG. 1. The ECT includes a compressor section 50, an electric machine section 52, and a turbine section 54. Coupled to a common shaft 60 are: a compressor wheel 62 fixed axially by nut 64, a rotor 66 of the electric machine, and a turbine wheel 68 (welded). Alternatively, turbine wheel 68 may be threaded onto shaft 60.

Figure 1:
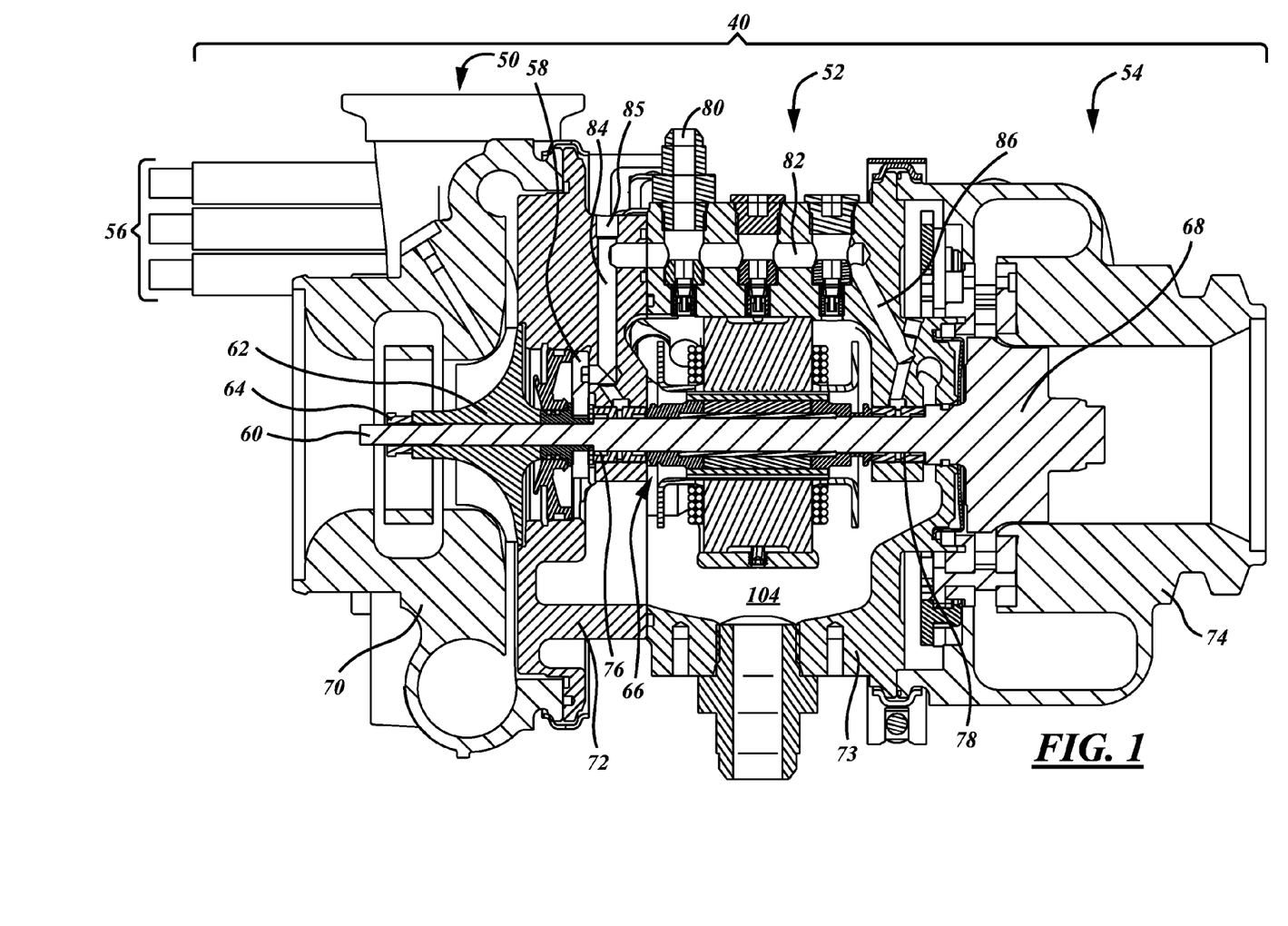
FIG. 1 is a cross-sectional representation of an electronically-controlled turbocharger (ECT) that includes a high-speed electric motor.

The embodiment in FIG. 1 includes four housing sections that are coupled together: a compressor housing section 70, two electric machine housing sections 72 and 73, and a turbine housing section 74. (In embodiments without a turbomachine, i.e., just a high-speed electric machine, the housing for the motor may include fewer sections.) Rotating shaft 60 is supported in the housings by bearings 76 and 78. A thrust bearing 58 is provided between the compressor and the housing. An electrical connector 56, which couples with high power electronics (not shown), exits ECT 40.

In the embodiment in FIG. 1, lubricant is used as the coolant for the electric motor. Thus, the lubrication system and the cooling system are integrated. Or, the two systems may be separated, which allows different fluids to be used in the systems.

Pressurized lubricant, which is engine oil in one embodiment, is provided to ECT 40 through inlet 80. Lubricant from inlet 80 fills manifold 82. Manifold 82 is fluidly coupled to oil passages 84 and 86 with passage 84 providing lubricant to bearing 76 and passage 86 providing lubricant to bearing 78. A plug 85 is provided at the outside end of passage 84 to seal off the drilling to form passage 84. FIG. 1 shows one embodiment of an ECT, a non-limiting application that uses a high-speed electric motor.

Figures 2, 3:
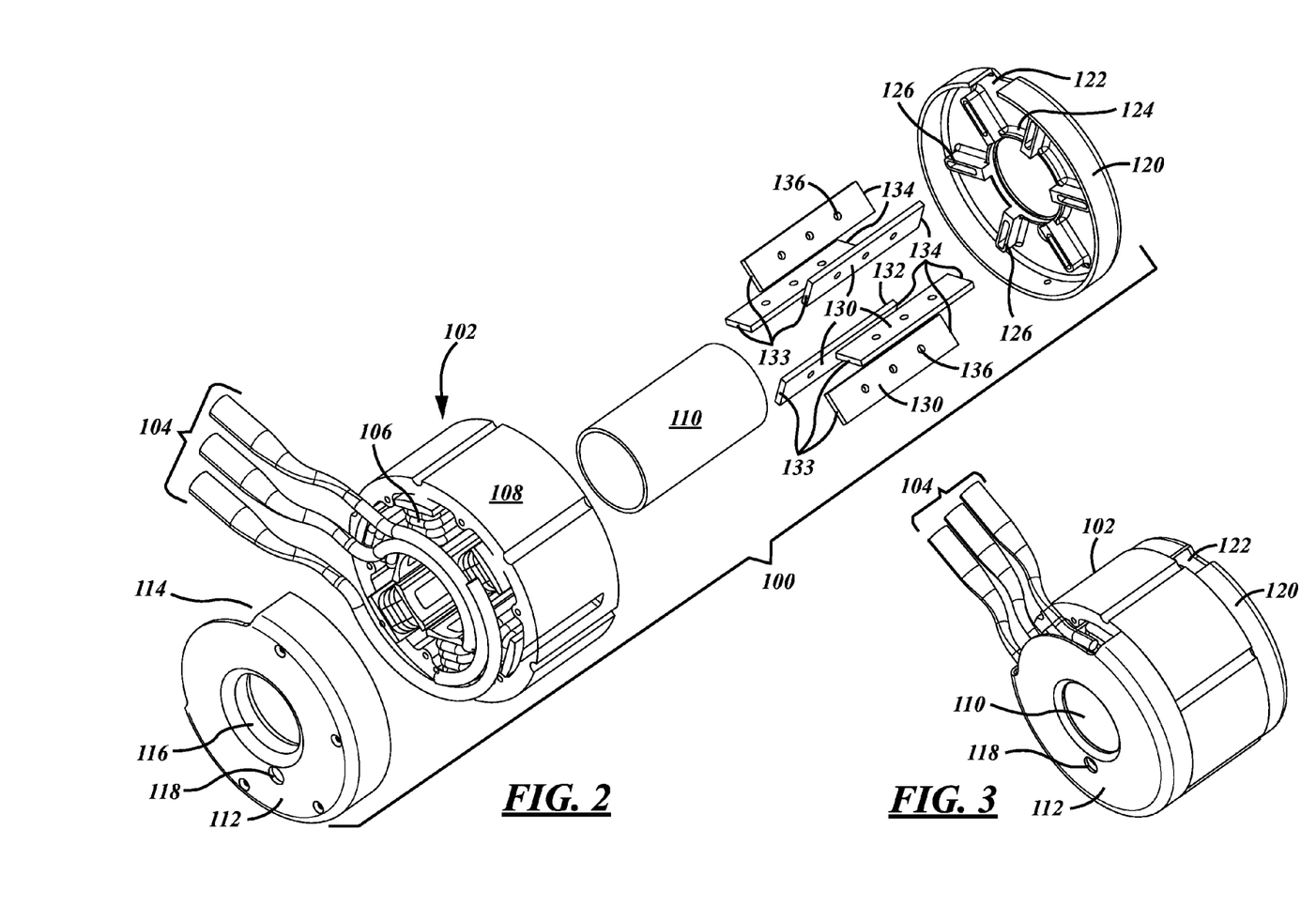
FIG. 2 is an exploded view of a stator and an embodiment of an coolant guide.
FIG. 3 is a view of the stator and coolant guide of FIG. 2 as assembled.

In FIG. 2, a stator and cooling guide assembly 100 is shown in an exploded view. A stator 102 has coils 106, conductors 104, and a back iron 108. A tubular shield 110 slides into a central opening in stator 102. Shield 110 is provided to prevent coolant from accessing the rotor (not shown). A first end cap 112 has an opening 114 to provide an exit point for conductors 104 of stator 102 when assembled. An annular end cap 112 couples to tubular shield 110 via a tubular portion 116 of end cap 112 that protrudes from the central opening of end cap 112. End cap 112 has a hole 118 for draining coolant. Tubular shield 110 is also coupled to another annular end cap 120 at a tubular portion 124. End cap 120 has an inlet opening 122 that can be used to provide coolant to stator 102. End cap 120 also has multiple finger supports 126 on the side of end cap 120 that faces stator 102.

Stator 102 has six coils 106, not all of which can be separately identified in FIG. 2. There are spaces between adjacent coils. Fingers 130 are inserted into finger supports 126 and then inserted in the spaces between adjacent coils. An edge 132 of fingers 130 sits against the outer surface of tubular shield 110. An end 134 of fingers 130 that is opposite the end inserted into finger supports 126 of end cap 112. In other embodiments, end 134 is pressed against end cap 112 when assembled and end 134 is glued to end cap 132. Fingers 130 have a plurality of holes 136. Coolant is provided at an upper side of stator 102. Coolant drips through holes 136 to provide coolant to coils that are below the top coil. The number, size, and location of holes 136 can be adjusted depending on the location of the finger within the stator to distribute coolant as desired. Depending on the features of the coolant guide and input flow rate, the coils may be substantially flooded with coolant or coolant provided to the coils may quickly pass through to the cavity of the next lower coil. In either case, the coolant is directed in a manner in which all coils are provided coolant. In systems in which the stator is flooded, but without guiding, the coils are less uniformly cooled because there is no established path to ensure that all coils have coolant flow.

The term, drip, herein is not intended to be limited to individual drips, but instead also refers to streams of coolant.

The components shown in FIG. 2, other than those associated with the stator, are collectively called a coolant guide. That is annular end caps 112 and 120, tubular shield 110, fingers 130, and possibly other elements, depending on the embodiment, make up a coolant guide.

Figure 4:
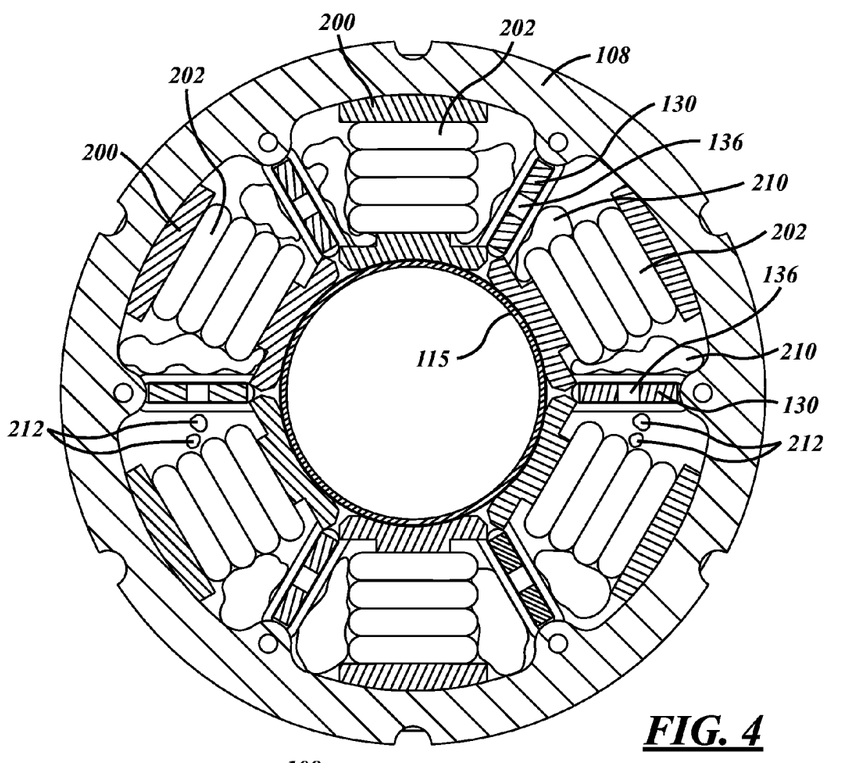
FIG. 4 is a cross-sectional illustration of the stator and coolant guide of FIG. 2.

An assembled version of stator 102 and the coolant guide of FIG. 2 is shown in FIG. 3. A cross section through the stator and coolant guide of FIG. 2 is illustrated in FIG. 4. The cross section is through holes 136 in fingers 130. Back iron 108 has teeth extending inwardly (not visible in FIG. 4) over which bobbins 200 are installed. Coils 202 are wrapped around bobbins 200. The cross section in FIG. 4 does not pass through a coolant inlet or outlet so those are not visible. Coolant 210 is provided to the stator and can be seen pooling in lower areas in each of the spaces between fingers 130. Also, a few drips 212 are shown in the illustration.

Figure 5:
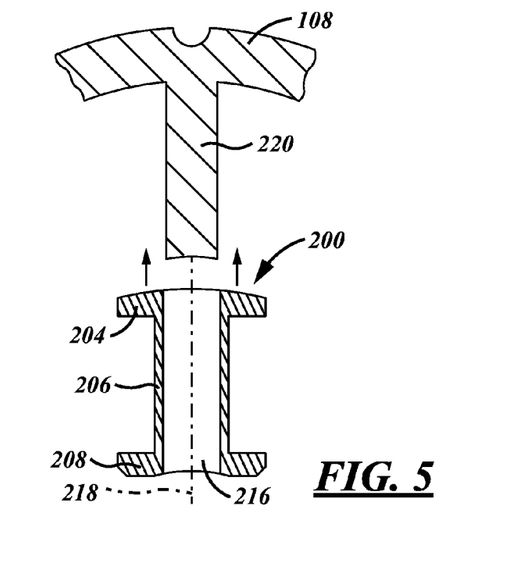
FIG. 5 shows a detail of a portion of the back iron, a tooth coupled to the back iron, and a bobbin.

A portion of back iron 108 and of bobbin 200 is shown in cross section in FIG. 5. Bobbin 200 has an outer plate 204, a middle section 206, and an inner plate 208. Along a central axis 218 of bobbin 200 is an opening 216 so that bobbin 200 can be slid over a tooth 220 that extends from back iron 108 (inwardly in relation to the back iron). Such an embodiment simplifies production as coils can be wound around the bobbins prior to sliding the bobbins over the teeth connected to the back iron. In alternative embodiments, the coils are wound directly onto the teeth, which is difficult within the interior of the stator.

Figure 6:
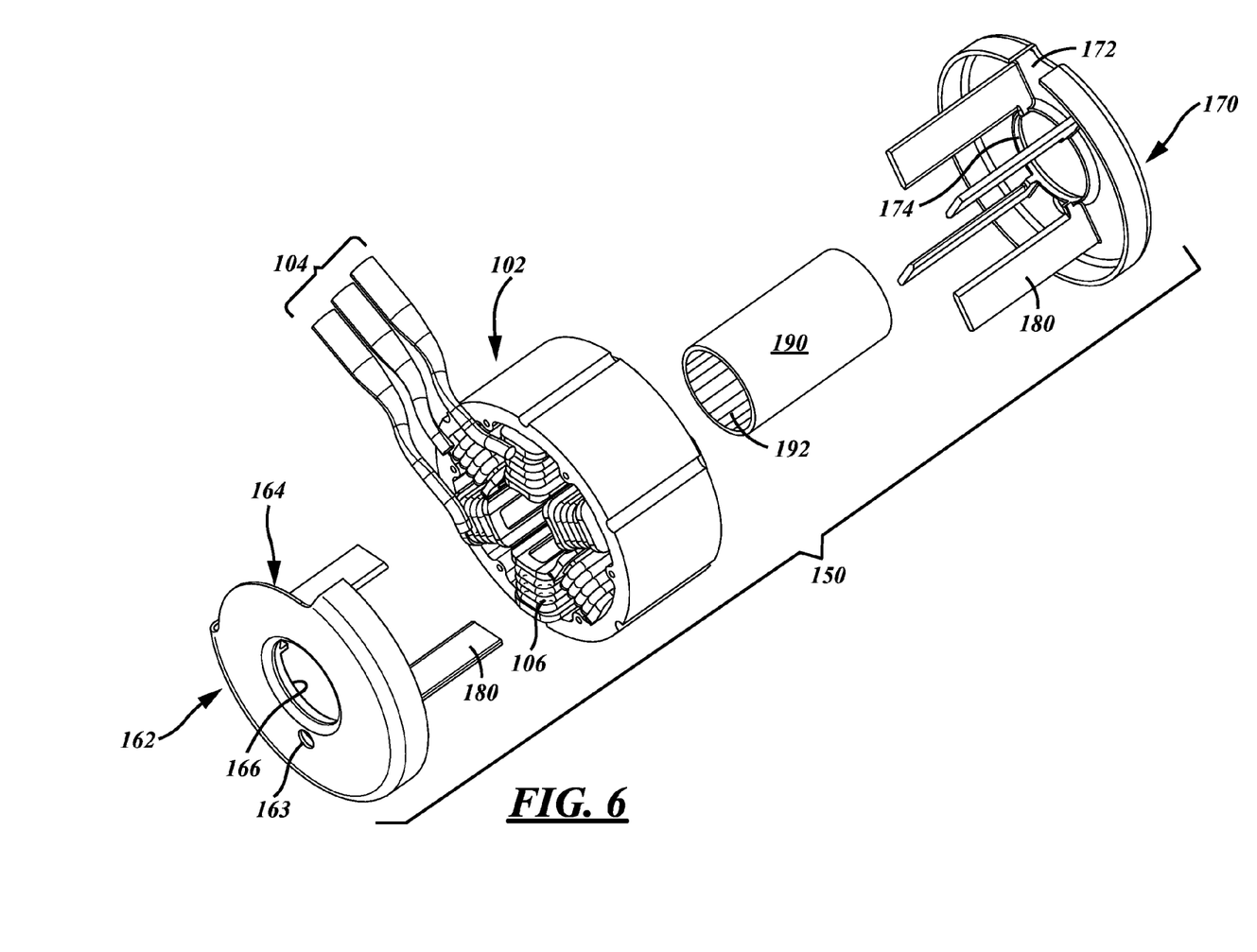
FIG. 6 is an exploded view of a stator and an embodiment of an coolant guide.

An alternative embodiment of a coolant guide is illustrated in FIG. 6. An annular end cap 162 is coupled to a tubular shield 190 at edge 166. An opening 164 accommodates conductors 104. A drain hole 163 is provided in end cap 162. Drain hole 163 can be located higher or lower and can be bigger or smaller depending on how much flooding is desired. A second end cap 170 has an opening 172 to serve as a coolant inlet. A lip 174 couples to tubular shield 190. End cap 162 has two fingers 180 extending from the inside surface of end cap 162. Fingers 180 extending from end cap 162 are substantially diametrically opposed. The coolant guide also has an annular end cap 170 with four fingers 180 extending from the inner surface. Two fingers near the top form an angle of about 60 degrees and the two fingers near the bottom also form an angle of 60 degrees. Fingers 180 coupled to end cap 162 do not extend all the way to end cap 170 (when assembled). Similarly, fingers 180 coupled to end cap 170 do not extend all the way to end cap 162. By doing so, coolant is directed through a labyrinth-like structure within the coolant guide. In an alternative embodiment, fingers 180 also have holes (like the embodiment in FIG. 2) so that the coolant drips through fingers 180 and moves through the labyrinth-like path. Tubular shield 190 has a plurality of axial grooves 192 that provide an egress route for coolant that finds its way to the rotor (rotor not shown in FIG. 3; but when the motor is completely assembled the rotor is inside tubular shield 190). It has been found that at some operating conditions coolant finds its way to the rotor. Grooves 192 provide an exit path for the coolant. Tubular shield 110 without grooves 192 or tubular shield 190 with grooves 192 may be used in any embodiment depending on the application.

Figure 7:
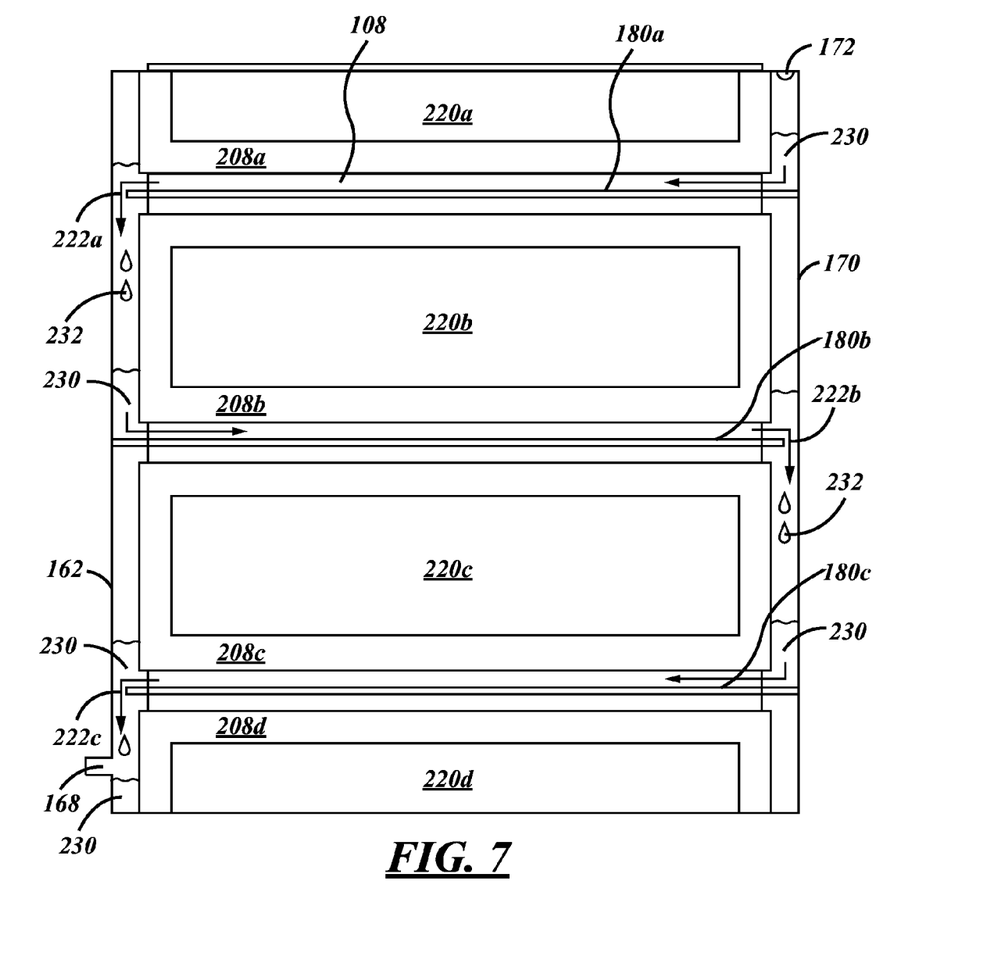
FIG. 7 is an illustration of the stator and coolant guide of FIG. 6 as cut in half and flattened.

In FIG. 7, an illustration of a portion of the stator and a portion of the coolant guide of FIG. 6 is shown as cut in half through a central axis of the stator and opened up so that the back iron is flat. The tubular shield is removed in this illustration. From this view, a half of an inner plate 208a of bobbin 200a (not shown) about which an upper coil is wound, a half of an inner plate 208d of bobbin 200d (not shown) about which an upper coil is wound, and two middle inner plates 208b, 208c of bobbins 200b, 200c (not shown) are visible. As there is an opening defined in the bobbins (element 216 in FIG. 5), ends of teeth 220a, 220b, 220c, and 220d are also visible.

Fingers 180a and 180c are coupled to end cap 170. Finger 180b is coupled to end cap 162. End cap 170 has a coolant inlet 172 defined at an upper edge. Coolant is provided to the top coil, which is associated with top plate 208a. Coolant builds up in the voids and travels from right to left with respect to the illustration to exit at the left hand side of finger 180a where there is a gap 222a. Drips of coolant 232 collect at that bottom of the region associated with top plate 208b. Coolant 230 travels from left to right to gap 222b where it drips in the region associated with top plate 208c. Coolant then travels from right to left to gap 222c. Coolant 230 exits at drain 168.

Figures 8, 10:
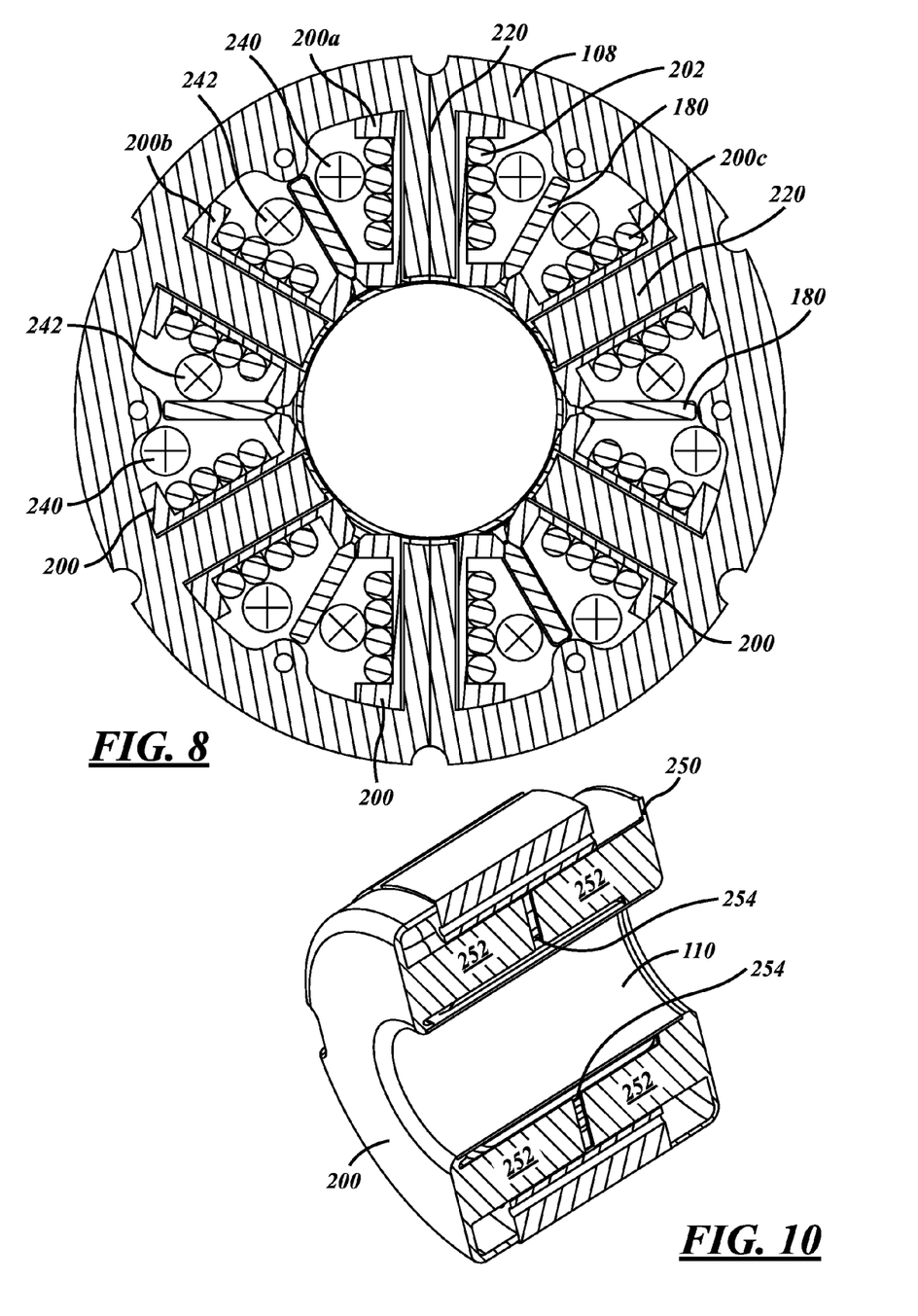
FIG. 8 is a cross-sectional illustration of the stator and coolant guide of FIG. 6.
FIG. 10 is a cross-sectional illustration of the stator and coolant guide of FIG. 9.

A cross section of the coolant guide and stator of FIG. 6 is shown in FIG. 8. Flow out of the page is shown by plusses 240 and flow into the page is shown by Xes 242. Flow surrounding the upper coil is moving out of the page. Coolant flows in the regions association with the adjacent coils 200b and 200c. In this way, the coolant flows through a labyrinth so that coolant flows by each of the coils.

Figure 9:
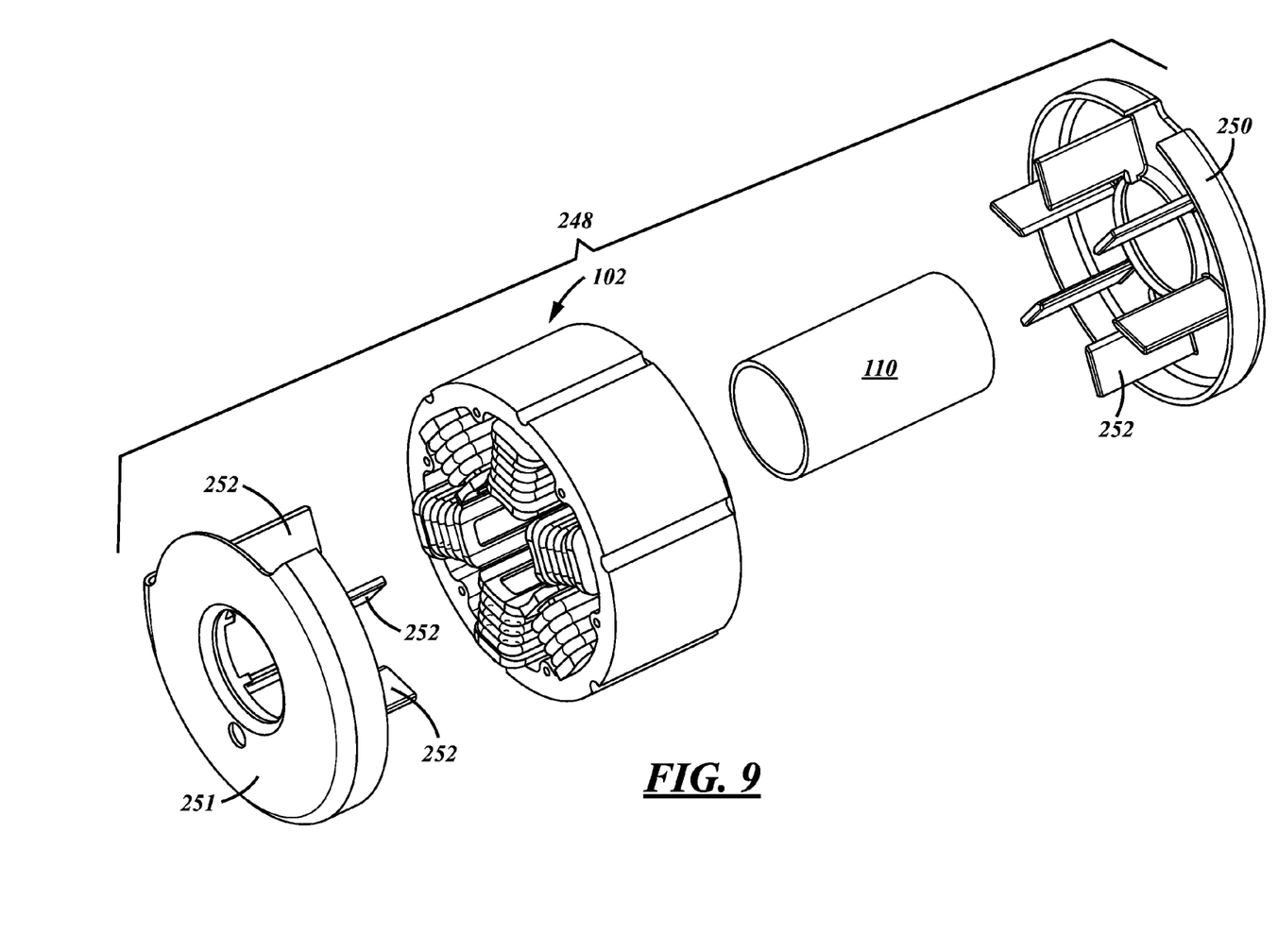
FIG. 9 is an exploded view of a stator and an embodiment of a coolant guide.

Another embodiment of a coolant guide and stator are shown in FIGS. 9 and 10. In FIG. 9, an assembly 248 of the stator and the coolant guide is shown exploded. Annular end caps 250 and 251 on each have six fingers 252 protruding from each end cap 250 and 251 toward stator 102. The assembled stator and coolant guide is shown in cross section in FIG. 10. Fingers 252 from the two end caps 250 and 251 do not meet in the middle, but instead leave a gap 254 for coolant to trickle downward to lower coils. In FIG. 10, a cross-sectional view showing gap 254 between fingers 252 is shown.

Figure 11:
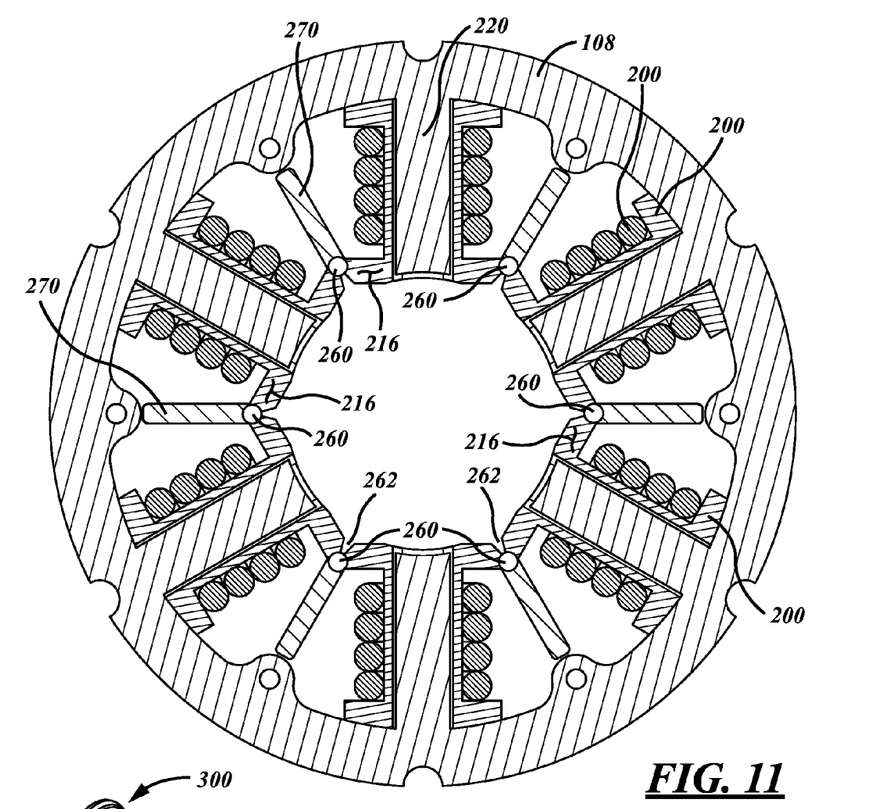
FIG. 11 is a cross-sectional illustration of a stator and coolant guide using an adhesive or potting material between adjacent bobbins.

The coolant guide embodiments in FIGS. 2, 6, and 9 all show a tubular shield. In FIG. 11, there is no tubular shield. Instead an adhesive, potting, or other sealant 260 is forced into the region between adjacent inner plates 216 of bobbins 200 and ends of fingers 270. In the embodiment shown in FIG. 11, a groove 262 remains. Groove 262 may be helpful in providing an axial egress route for coolant that inadvertently accesses the rotor area.

The embodiments described above use gravity feed within the stator to distribute the coolant to the coils. Alternatively, the coolant guide may have internal passages that are pressurized by having internal passages within at least one of the end caps fluidly coupled to the pressurized coolant. One embodiment of such a coolant guide and stator 102 is shown in an exploded view in FIG. 12. Annular end caps 300 have fingers 302 that extend from end caps 300 into voids between coils in stator 102. Annular end cap 300 has a ring portion 306 which has an internal volume (not visible). Coolant passages (not visible) which are fluidly coupled to the internal volume within ring portion 306 are provided within fingers 302. The coolant passages are in fluidic communication with the internal volume in annular portion 306. Fingers 302 have one or more holes 304 along their length. Coolant within fingers 302 is pressurized and sprays onto coils 106 from holes 304. In one embodiment, annular end caps 306 are identical and each are provided pressurized coolant to be sprayed onto the coils. In another embodiment, one of the annular end caps has fingers that extend substantially through the entire gap between adjacent fingers. The other annular end cap has no fingers. In such an embodiment, pressurized coolant is only provided to the annular end cap with fingers. In yet another embodiment, each annular end cap has three fingers with coolant provided to one of the end caps and flow going back and forth between the end caps in a labyrinthine manner, e.g., from a cavity in the first end cap through a first finger with some of the flow spraying on a first coil with most of the flow going to a passage in the second end cap that feeds a second finger. Note that the pressurized embodiment discussed immediately above does not include elements 308.

Figure 12:
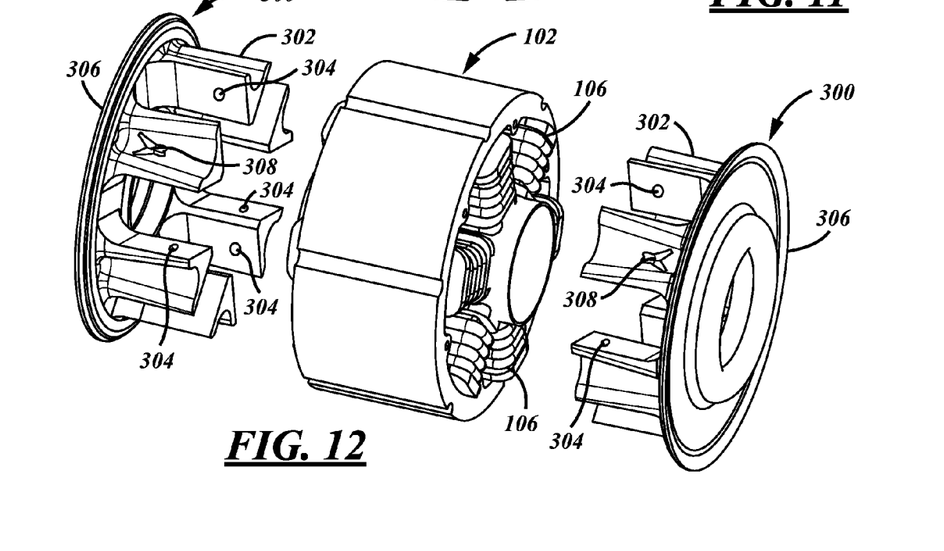
FIG. 12 is an exploded vies of a stator and an embodiment of a coolant guide.

In yet another embodiment consistent with FIG. 12, coolant is provided to a coolant guide 300 by gravity feed on at least one of the fingers 302. Coolant collects on the cupped portion of fingers 302. An opening 308 allows oil to flow through finger 302 through fingers 302 through holes 304. There may be two passages through finger 302, each at openings 308 and outlets at two or more holes 304, on different surfaces of finger 302. In this embodiment, coolant is provided to coils 106 via gravity feed.

Elements of the coolant guides may be coupled via bolts, adhesive, friction welding, or any suitable coupler. The embodiments discussed above have six coils. However, this is a non-limiting example. Electric machines with other numbers of coils are within the scope of the present disclosure.

Figure 13:
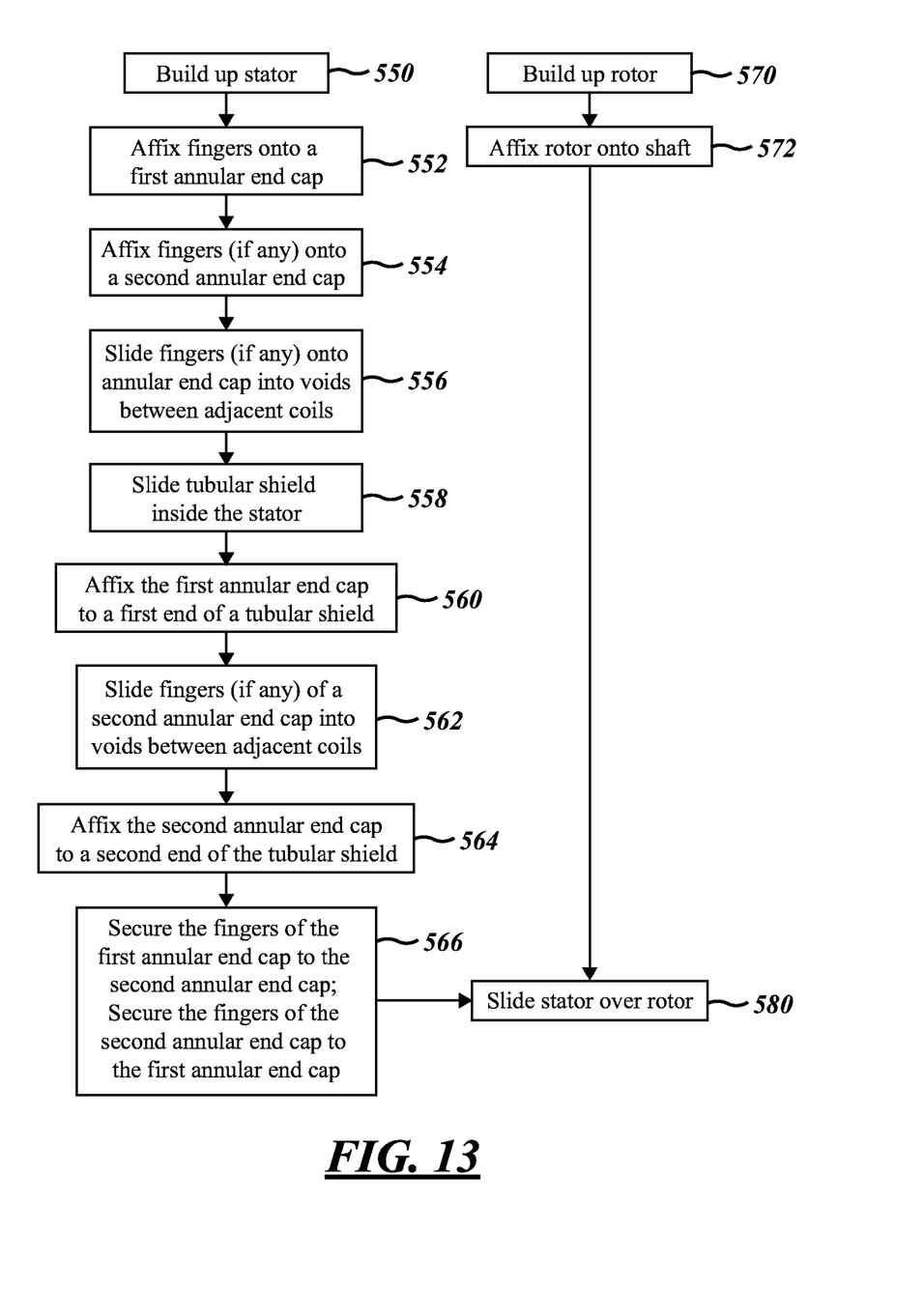
FIG. 13 is a flowchart showing processes that may be undertaken to assemble an electric machine having a coolant shield.

A process by which the coolant guide is assembled to the stator is shown in FIG. 13. The stator is built up in block 550. As the present disclosure is directed toward the coolant guide included in the stator assembly, details in assembling the stator are not included here. In block 552, fingers are affixed onto a first annular end cap. In block 554, fingers, if any, are affixed to a second annular cap. In some embodiments, the fingers and the end cap are integrally formed. The fingers of the first annular end cap are slid inside the stator in block 556. The tubular shield is slid into the stator in block 558. In embodiments without a tubular shield, the potting or adhesive is instead applied to the gaps between adjacent bobbins instead. In block 560, the first annular end cap is coupled to a first end of a tubular shield. In block 562, fingers of the second annular end cap are slid into voids between adjacent coils. In embodiments with no fingers on the second end cap, the second annular end cap is simply placed onto the stator. The second annular end cap is affixed to a second end of the tubular shield in 564. In embodiments where the fingers are attached at both ends is shown in block 566. In block 570 the rotor is built up and then affixed to the shaft in block 572. The stator is slid over the rotor in block 580.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An electric motor, comprising:
   a housing;
   a shaft;
   two bearings mounted between the shaft and the housing;
   a rotor secured to the shaft and located between the bearings;
   a stator mounted in the housing and received over the rotor, the stator including a plurality of coils; and
   a coolant guide containing pressurized coolant and having a plurality of elongated fingers each extending axially through the stator between adjacent pairs of coils, each of the plurality of elongated fingers having a coolant passage extending axially therein, and each of the plurality of elongated fingers defining transversely therein along at least a portion of a length thereof one or more outlet holes fluidly coupled to the pressurized coolant via the coolant passage such that the pressurized coolant passes axially through the coolant passage and sprays from the one or more outlet holes transversely onto at least one of the adjacent pairs of coils.

2. The electric motor of claim 1, further comprising:
a turbine wheel affixed to the shaft; and
a compressor wheel affixed to the shaft with one of the two bearings mounted on the shaft between the turbine wheel and a first end of the rotor and the other of the two bearings mounted on the shaft between second end of the rotor and the compressor wheel, the second end of the rotor opposite the first end of the rotor.

3. The electronically controlled turbocharger of claim 2, wherein the stator further comprises:
a substantially cylindrical back iron;
a plurality of teeth extending from an inner surface of the back iron; and
a plurality of bobbins each received over a different one of the plurality of teeth, each of the plurality of bobbins having an inner plate, an outer plate, and a middle section extending between the inner and outer plate, each of the inner plate, the outer plate, and the middle section defining an opening along an axis of the bobbin to permit installation of the bobbin onto one of the plurality of teeth, each outer plate abutting the inner surface of the back iron,
wherein each of the plurality of coils is wound around the middle section of a different one of the plurality of bobbins, and a material is placed between adjacent inner plates of each of the plurality of bobbins to substantially prevent flow of coolant through the adjacent inner plates.

4. The electronically controlled turbocharger of claim 2 wherein the stator further comprises a back iron, and the coolant guide further comprises:
a first annular end cap abutting a first end of the back iron; and
a second annular end cap abutting a second end of the back iron.

5. An electric motor, comprising:
a housing;
a shaft;
two bearings mounted between the shaft and the housing;
a rotor secured to the shaft and located between the bearings;
a stator mounted in the housing and slid over the rotor; and
a coolant guide having a plurality of fingers, wherein the stator has a plurality of coils and the fingers of the coolant guide are arranged between adjacent pairs of coils,
wherein the coolant guide further comprises:
a first annular end cap;
a second annular end cap;
a tubular shield having a first end and a second end with the first end coupled to the first annular end cap and the second end coupled to the second annular end cap; and
a coolant inlet at a position located higher than a first of the plurality of coils, a first coil,
and wherein:
the coolant inlet is defined in the first annular end cap;
at least a portion of the coolant supplied to the coolant inlet contacts a first of the plurality of coils, the first coil;
fingers adjacent to the first coil are a first and a second of the plurality of fingers, the first and second fingers;
the first and second fingers are coupled to the first annular end cap;
there is a first gap between the first finger and the second annular end cap;
there is a second gap between the second finger and the second annular end cap;
a first portion of coolant that is supplied to the first coil moves along the first finger toward the first gap and contacts a second of the plurality of coils, the second coil; and
a second portion of coolant that is supplied to the first coil moves along the second finger toward the second gap onto a third of the plurality of coils, the third coil.

6. The electric motor of claim 5 wherein a surface of the tubular shield adjacent to the rotor has a plurality of axial grooves.

7. The electric motor of claim 5 wherein the stator further comprises a back iron surrounding the plurality of coils and the back iron substantially abuts the first and second annular end caps, the electric motor further comprising:
a drain opening defined in one of the annular end caps.

8. The electric motor of claim 5, wherein:
the fingers adjacent the second coil are the first finger and a third of the plurality of fingers, the third finger;
the fingers adjacent the third coil are the second finger and a fourth of the plurality of fingers, the fourth finger;
the third and fourth fingers are coupled to the second annular end cap;
there is a third gap between the third finger and the first annular end cap;
there is a fourth gap between the fourth finger and the first annular end cap;
at least a portion of the coolant that leaves the second coil contacts the third finger;
a portion of coolant that is supplied to the second coil moves along the third finger toward the third gap and contacts a fourth of the plurality of coils, the fourth coil; and
a portion of coolant that is supplied to the third coil moves along the fourth finger toward the fourth gap and contacts a fifth of the plurality of coils, the fifth coil.

9. The electric motor of claim 5, further comprising:
a turbine wheel affixed to the shaft; and
a compressor wheel affixed to the shaft with one of the two bearings mounted on the shaft between the turbine wheel and a first end of the rotor and the other of the two bearings mounted on the shaft between second end of the rotor and the compressor wheel, the second end of the rotor opposite the first end of the rotor.

10. The electronically controlled turbocharger of claim 9, wherein the stator further comprises:
a substantially cylindrical back iron;
a plurality of teeth extending from an inner surface of the back iron; and
a plurality of bobbins each received over a different one of the plurality of teeth, each of the plurality of bobbins having an inner plate, an outer plate, and a middle section extending between the inner and outer plate, each of the inner plate, the outer plate, and the middle section defining an opening along an axis of the bobbin to permit installation of the bobbin onto one of the plurality of teeth, each outer plate abutting the inner surface of the back iron, wherein each of the plurality of coils is wound around the middle section of a different one of the plurality of bobbins, and a material is placed between adjacent inner plates of each of the plurality of bobbins to substantially prevent flow of coolant through the adjacent inner plates.

11. An electric motor, comprising:
a housing;
a shaft;
two bearings mounted between the shaft and the housing;
a rotor secured to the shaft and located between the bearings;
a stator mounted in the housing and received over the rotor; and
a coolant guide having a plurality of elongated fingers, wherein the stator includes a plurality of coils and each of the plurality of elongated fingers extends axially through the stator between adjacent pairs of coils,
wherein the coolant guide further comprises:
a first annular end cap;
a second annular end cap;
a tubular shield having a first end and a second end with the first end coupled to the first annular end cap and the second end coupled to the second annular end cap; and
a coolant inlet at a position located higher than a first of the plurality of coils, a first coil,
and wherein:
a first end of each of the plurality of elongated fingers is coupled to the first annular end cap and a second end of each of the plurality of elongated fingers is coupled to the second annular end cap; and
each of the plurality of fingers defines along a portion of a length thereof a plurality of holes each positioned to pass coolant transversely between the adjacent pairs of coils.

12. The electric motor of claim 11 wherein:
at least a portion of coolant supplied to the coolant inlet contacts a first of the plurality of coils;
fingers adjacent to the first coil are a first and a second of the plurality of fingers, the first and second fingers;
a first portion of coolant that passes through holes in the first finger to drip onto a second of the plurality of coils, the second coil; and
a second portion of coolant passes through holes in the second finger to drip onto a third of the plurality of coils, the third coil.

13. The electric motor of claim 11, further comprising:
a turbine wheel affixed to the shaft; and
a compressor wheel affixed to the shaft with one of the two bearings mounted on the shaft between the turbine wheel and a first end of the rotor and the other of the two bearings mounted on the shaft between second end of the rotor and the compressor wheel, the second end of the rotor opposite the first end of the rotor.

14. The electronically controlled turbocharger of claim 13, wherein the stator further comprises:
a substantially cylindrical back iron;
a plurality of teeth extending from an inner surface of the back iron; and
a plurality of bobbins each received over a different one of the plurality of teeth, each of the plurality of bobbins having an inner plate, an outer plate, and a middle section extending between the inner and outer plate, each of the inner plate, the outer plate, and the middle section defining an opening along an axis of the bobbin to permit installation of the bobbin onto one of the plurality of teeth, each outer plate abutting the inner surface of the back iron, wherein each of the plurality of coils is wound around the middle section of a different one of the plurality of bobbins, and a material is placed between adjacent inner plates of each of the plurality of bobbins to substantially prevent flow of coolant through the adjacent inner plates.

15. An electric motor, comprising:
a housing;
a shaft;
two bearings mounted between the shaft and the housing;
a rotor secured to the shaft and located between the bearings;
a stator mounted in the housing and slid over the rotor; and
a coolant guide having a plurality of fingers, wherein the stator has a plurality of coils and the fingers of the coolant guide are arranged between adjacent pairs of coils,
wherein the coolant guide further comprises:
a first annular end cap;
a second annular end cap;
a tubular shield having a first end and a second end with the first end coupled to the first annular end cap and the second end coupled to the second annular end cap; and
a coolant inlet at a position located higher than a first of the plurality of coils, a first coil,
and wherein:
a first portion of the plurality of fingers extend outwardly from the first annular end cap;
a second portion of the plurality of fingers extend outwardly from the second annular end cap;
a first of the first portion of the plurality of fingers and a first of the second portion of the plurality of fingers extend between a first and a second of the plurality of coils with a gap between ends of the first of the first portion of the plurality of fingers and the first of the second portion of the plurality of fingers.

16. The electric motor of claim 15, further comprising:
a turbine wheel affixed to the shaft; and
a compressor wheel affixed to the shaft with one of the two bearings mounted on the shaft between the turbine wheel and a first end of the rotor and the other of the two bearings mounted on the shaft between second end of the rotor and the compressor wheel, the second end of the rotor opposite the first end of the rotor.

17. The electronically controlled turbocharger of claim 16, wherein the stator further comprises:
a substantially cylindrical back iron;
a plurality of teeth extending from an inner surface of the back iron; and
a plurality of bobbins each received over a different one of the plurality of teeth, each of the plurality of bobbins having an inner plate, an outer plate, and a middle section extending between the inner and outer plate, each of the inner plate, the outer plate, and the middle section defining an opening along an axis of the bobbin to permit installation of the bobbin onto one of the plurality of teeth, each outer plate abutting the inner surface of the back iron, wherein each of the plurality of coils is wound around the middle section of a different one of the plurality of bobbins, and a material is placed between adjacent inner plates of each of the plurality of bobbins to substantially prevent flow of coolant through the adjacent inner plates.

\* \* \* \* \*